Nov. 9, 1965   F. T. KALLET ETAL   3,217,246
APPARATUS FOR DETERMINING FLAWS IN THE INSULATION OF AN
INSULATED WIRE BY PASSING THE WIRE THROUGH
A MERCURY BATH
Filed Nov. 6, 1962   3 Sheets-Sheet 1

FRED T. KALLET
HARRY RETALIS
VINCENT J. BLANCO
INVENTORS

BY
ATTORNEYS

FRED T. KALLET
HARRY RETALIS
VINCENT J. BLANCO
INVENTORS

3,217,246
APPARATUS FOR DETERMINING FLAWS IN THE INSULATION OF AN INSULATED WIRE BY PASSING THE WIRE THROUGH A MERCURY BATH
Fred T. Kallet, Lincoln Park, Harry Retalis, Paterson, and Vincent J. Blanco, Clifton, N.J., assignors to General Precision Inc., Little Falls, N.J., a corporation of Delaware
Filed Nov. 6, 1962, Ser. No. 235,649
2 Claims. (Cl. 324—54)

The present invention relates to apparatus for detecting flaws in wire insulation, and more particularly to an apparatus which automatically counts the number of of flaws in the insulation of magnetic wire as the wire is passed therethrough.

In accordance with one embodiment of the present invention, flaws in the insulation of a magnet wire are detected by passing the wire through a mercury bath with an electric circuit including a neon lamp connected across the center conductor of the wire and the mercury bath. When flaws in the wire insulation are encountered, current flows through the neon lamp which actuates a photoelectric cell. The photo cell, in turn, trips a magnetic counter to automatically count the number of flaws in the insulation of the magnet wire as it passes through the mercury bath.

Accordingly, it is one object of the invention to provide an apparatus for monitoring the number of defects in the insulation of an insulated wire.

It is another object of the invention to provide apparatus for automatically counting flaws in the insulation of magnet wire.

It is a further object of the invention to provide an apparatus for automatically counting defects in the insulation of a magnet wire in which the magnet wire is passed through a mercury bath and the center conductor of the wire and the mercury bath are connected in an electrical circuit which actuates a counting device when current flows therethrough as a result of flaws in the wire insulation.

It is a still further object of the invention to provide apparatus for automatically counting flaws in the insulation of magnet wire which is energized by a common line source of 115 volts/60 cycles and has a sensitivity which can be varied in a simple manner.

It is a still further object of the invention to provide an apparatus of the type described above for counting flaws in the insulation of a wire which automatically shuts itself off after a preset footage of wire has been tested.

It is a still further object of the invention to provide apparatus of the type described above employing a mercury bath having a removable plug which simplifies threading the wire through the mercury bath and holds the wire in the mercury bath uniformly during testing.

It is a still further object of the invention to provide apparatus for counting defects in the insulation of a magnet wire which is accurate and reliable, rugged in construction, economical to manufacture, and can be easily and quickly operated.

Other objects and features of novelty of the present invention will be specifically pointed out or will otherwise become apparent when referring, for a better understanding of the invention, to the following description taken in conjunction with the accompanying drawings, wherein.

Figure 1:
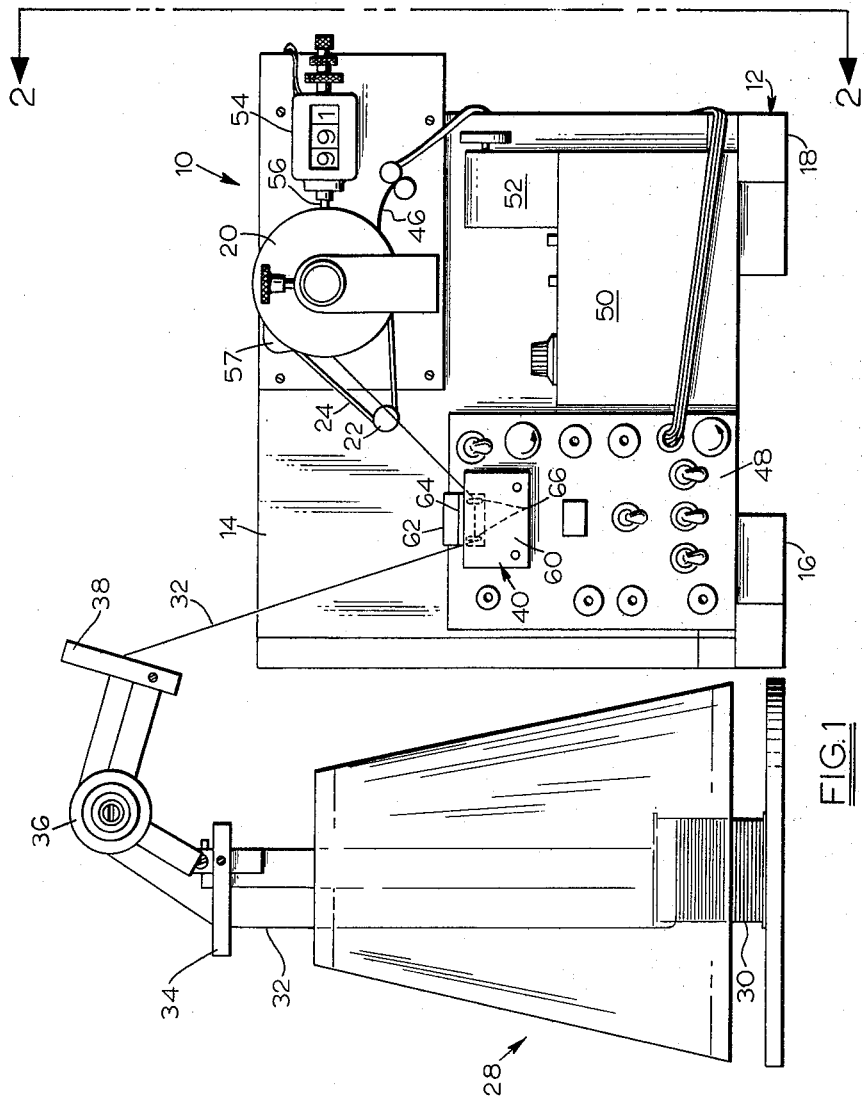
FIG. 1 is a front view of apparatus illustrating one embodiment of the invention.
Figure 2:
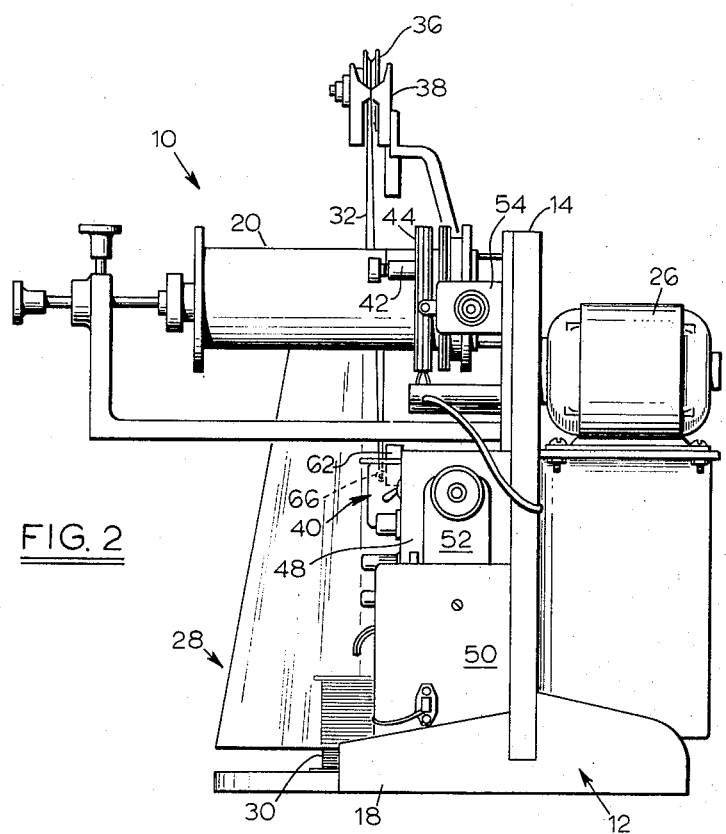
FIG. 2 is an end view of the apparatus illustrated in FIG. 1.

Referring to FIGS. 1 and 2, an apparatus 10 is shown which illustrates one embodiment of the present invention. It comprises a base 12 having a vertical wall 14 and laterally projecting, spaced supporting legs 16 and 18. A take-up spool 20 is rotatably supported on the wall 14 and drivingly connected to a drive shaft 22 by a belt 24. The drive shaft 22 is driven by an electrical motor 26 mounted on the other side of the wall 14.

A de-reeler 28 is positioned adjacent to the base 12 for supporting and de-reeling a spool 30 of insulated wire 32, such as magnet wire. The wire 32 is passed through a guide 34 on the de-reeler, over an idler wheel 36 and through a guide 38. It then passes through a mercury bath assembly 40 with the free end thereof connected to a binding post 42 on the take-up spool 20 so that the wire is advanced through the mercury bath assembly 40 and wound around the take-up spool when the motor 26 is energized. The insulation on the free end of the wire is removed so that the bare end of the wire will make electrical connection with the binding post 42. The binding post in turn is electrically connected to a brass slip ring 44 on the face of the inner flange of the spool, and a brush 46 slidably engages the slip ring 44 to provide a continuous electrical connection with the center conductor of the wire.

The mercury bath assembly 40 is mounted on a control panel 48, which in turn is mounted on the supporting wall 14. The control panel houses a suitable control circuit such as that illustrated in FIG. 3, and which will be described in greater detail hereinafter. The mercury bath 40 and brush 46 are connected in this control circuit to provide an open circuit when the insulation on the portion of the magnet wire in the mercury bath assembly has no flaws. However, when the insulation of the portion of the wire passing through the mercury bath assembly has a flaw, current will flow through the control circuit and the flaw will be counted automatically by a photoelectronic relay circuit in a box 50 and a reset magnetic counter 52 mounted on the supporting wall 14. A ratchet counter 54 is mounted adjacent to the take-up spool 20 with the actuator 56 thereof in position to be actuated by a cam 57 on the inner flange of the take-up spool 20. The ratchet counter 54 is also connected in the control circuit, as will be described, to automatically terminate counting by the counter 52 after a preset footage of wire has been tested.

The mercury bath assembly 40 comprises a housing 60 filled with mercury and having a removable plug 62 of a suitable material, such as polytetrafluoroethylene, projecting into and closing off an opening in the top thereof. The plug 62 is fixed in position by a clamp 64 and the magnet wire 32 passes around the sides of the plug and is threaded through the lower end of a pair of agate fish tips 66 coated with an epoxy based adhesive projecting downwardly from the plug 62. All metal parts are coated with an epoxy resin to preclude dissolution by the mercury bath. This may be done by painting with an epoxy adhesive material which, when set, forms the protective coating. With this arrangement, the magnet wire can be threaded through the fish tips when the plug 62 is removed to simplify the operation, and when the plug is inserted into the mercury bath assembly 40, it will guide the wire uniformly through the mercury during the test. The mercury is preferably chemically pure and triple distilled, and the plug 62 should be carefully handled to avoid contamination.

Figure 3:
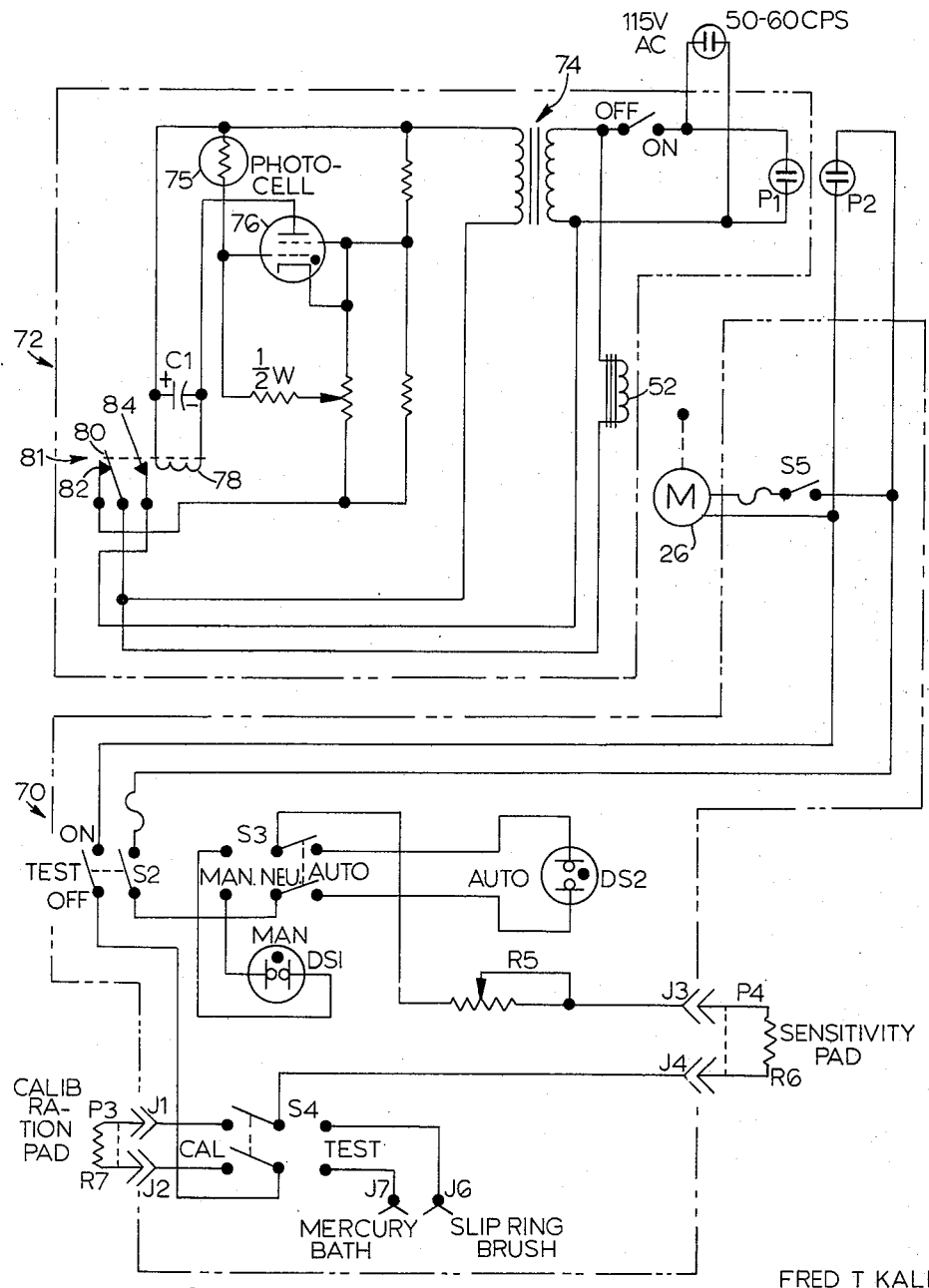
FIG. 3 is a schematic diagram of an electrical circuit for operating the apparatus illustrated in FIGS. 1 and 2.

Referring to FIG. 3, a control circuit 70 is illustrated which is physically contained within the control panel 48, along with a photo-electronic relay circuit 72 which is physically contained in the box 50. The control circuit 70 is connected to a common line source of 115 volts A.C., 60 c.p.s. by male and female plugs P1 which in turn are connected to a male plug P2 connectable directly to the common line source. A double-pole, single-throw, on-off switch S2 is provided along with a double-pole, double-throw, test and calibrate switch S4 and a double-pole, double-throw, automatic and manual switch S3 for controlling the operation of the control circuit 70. The electrical connection with the mercury bath is made at the terminal J7 and the electrical connection with the slip ring brush 46 is made at the terminal J6. A sensitivity pad in the form of a resistor R6 housed in a plug P4 is plugged in at the terminals J3 and J4 and a removable calibration pad in the form of a resistor R7 housed in a plug P3 is plugged in at the terminals J1 and J2. A manual neon lamp DS1 and automatic neon lamp DS2 are connected to the manual and automatic terminals of the switch S3, respectively, so that one or the other may be connected in series with a variable resistor R5 and the resistance R6 of the sensitivity pad. With the test switch S2 in its "on" position, the switch S3 in its automatic position and the switch S4 in its test position, the neon lamp DS2 will be energized each time a flaw is encountered in the wire as it passes through the mercury bath. A photocell 75 in the photo-electronic relay circuit 72 automatically detects the lighting of the neon lamp DS2 and the reset magnetic counter 52 automatically counts the flaws indicated by the photocell, as will be described. The neon lamp DS1 is positioned so that it can be observed by an operator who can personally count the number of times it lights in response to flaws in the wire passing through the mercury bath. Therefore when the switch S3 is shifting to its manual position, the operator can take charge of the counting of the defects.

To calibrate the control circuit 70 so that the neon lights will flash whenever the resistance of the insulation of the wire drops below a predetermined resistance to indicate a flaw, a calibration pad is plugged into the terminals J1 and J2 having a resistance R7 equal to the resistance desired for the insulation. The switch S4 is then thrown to its calibrate position and the switch S3 to its manual position. If the neon light DS1 lights, the control circuit will respond to any flaws in the insulation of the wire reducing the resistance to or below the resistance R7. The variable resistor R5 can then be adjusted to the point at which the neon light DS1 will remain energized and above which it will be de-energized. If the variable resistor R5 does not provide a sufficient range for reaching this point, the sensitivity pad may be removed and another with a larger resistor R6 plugged in its place. With the circuit calibrated in this manner, the switch S4 can then be thrown to its test position and the switch S3 to its automatic position so that the neon lamp DS2 will light each time the resistance of the insulation on the magnet wire drops to or below the value of the calibration resistance R7, and will not light when the resistance of the insulation is greater than the resistance of R7.

The photo-electronic relay circuit 72 is energized by the secondary winding of a transformer 74 and includes the photocell 75 which is energized by the lighting of the neon lamp DS2. The photocell 75 fires a thyratron 76 whose sensitivity is controlled by a variable resistor R4 which energizes a relay coil 78 in the plate circuit of the thyratron. The coil 78 attracts a movable contact 80 of a relay 81 away from a fixed contact 82 into electrical connection with a fixed contact 84. With the movable contact 80 shifted to this position, the reset magnetic counter 52, which is connected across the primary winding of the transformer 74, is energized. Also, when the movable contact 80 breaks contact with the contact 82 the thyratron 76 is cut off. This de-energizes the coil 78 so that the movable contact 80 returns to its normally closed position in engagement with the contact 82. Thus the thyratron is ready to be fired again by the photocell and the counter 52 ready to register another count.

The ratchet counter 54 counts the number of revolutions of the take-up spool 20 so that the switch S5 will automatically close when a predetermined footage of wire has been preset on the ratchet counter.

With this arrangement as described, wire can be passed through a one-inch mercury bath at the rate of 100 feet per minute and provide an accurate count with a common line source of 115 volts/60 cycles. The flaws in the insulation of the wire can be counted automatically or manually as described, and the device can automatically shut itself off when a predetermined footage has been reached. The testing is accomplished with a high degree of sensitivity which can be varied by the variable resistor R5 and also by plugging in different sensitivity pads in the terminals J3 and J4 of the control circuit 70. Further the shock hazard to an operator is reduced by using the neon lamps which limit the current of the test potential. And finally, the tester is very easy to operate, and less time-consuming than prior wire testers.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims. For example, a magnetic or voltage amplifier could be employed in place of the neon lamp and photoelectric arrangement to actuate a counter or other recording instrument for recording flaws in the insulation.

In the claims:

1. An apparatus for determining flaws in the insulation of an insulated wire, comprising in combination, take-up and de-reeling spools for passing the wire to be tested through the apparatus including electrical contact means to which one end of said wire is to be linked and cam means on said take-up spool; a mercury bath assembly in said apparatus to provide an open circuit when the insulation on a portion of the wire in said mercury bath has no flaws but providing an electrical output when said wire insulation is defective; a control circuit coupled to said mercury bath, including a connection to said contact means linked to said wire; lamp means energized each time the electric output in said control circuit reaches a predetermined magnitude as a result of flaws in said wire; photocell means energized by said lamp means; counter means energized by said photocell means, including a thyratron energized by said photocell and a counter energized by said thyratron; relay means for de-activating the thyratron after it has activated said counter; means for varying the resistance of said circuit in a manner to control the insulation flaws which are counted; and, a ratchet counter adjacent said take-up spool, actuated by the cam means thereon and coupled to said counter means terminating said counting after a preset footage of wire has been tested.

2. An apparatus as claimed in claim 1, including a binding post on said take-up spool, the one end of said wire having the insulation removed therefrom with the bared center conductor electrically connected to said binding post; and brush and slip ring means for making continuous electrical connection with said binding post, said control circuit being disposed between said brush and slip ring means and said mercury bath assembly.

References Cited by the Examiner
UNITED STATES PATENTS

| | | | |
|---|---|---|---|
| 1,938,684 | 12/33 | Bond et al. | 324—54 |
| 2,522,151 | 9/50 | Weeks | 324—54 |
| 2,799,013 | 7/57 | Langer | 324—54 X |

FREDERICK M. STRADER, *Primary Examiner.*

WALTER L. CARLSON, *Examiner.*